June 28, 1966   H. L. SMITH, JR   3,258,204
HIGH TEMPERATURE HEATING APPARATUS AND SYSTEM
Filed Nov. 14, 1963   3 Sheets-Sheet 1

INVENTOR
HORACE L. SMITH, JR.

BY *Strauch, Nolan & Neale*
ATTORNEYS

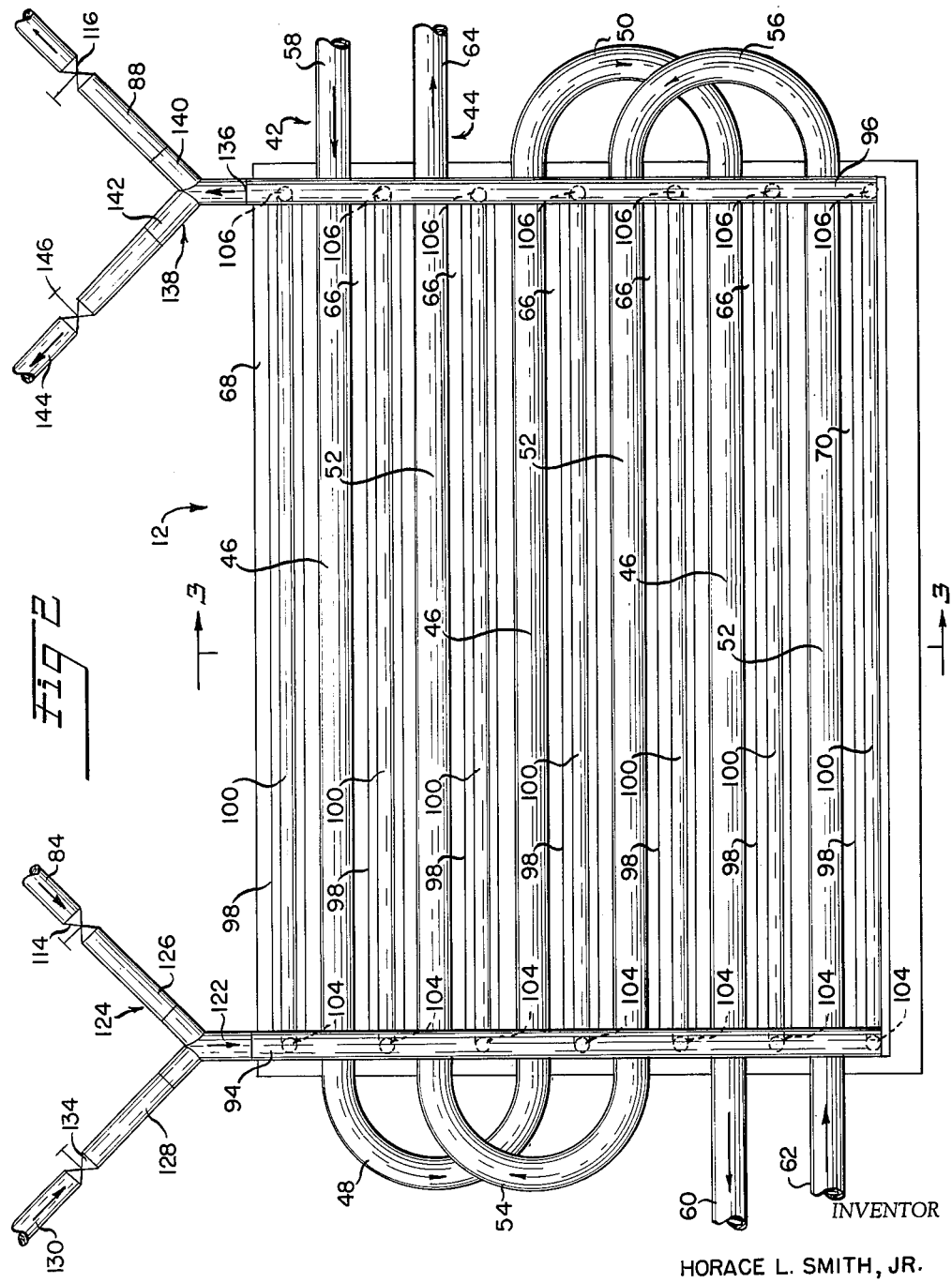

June 28, 1966  H. L. SMITH, JR  3,258,204
HIGH TEMPERATURE HEATING APPARATUS AND SYSTEM
Filed Nov. 14, 1963  3 Sheets-Sheet 3
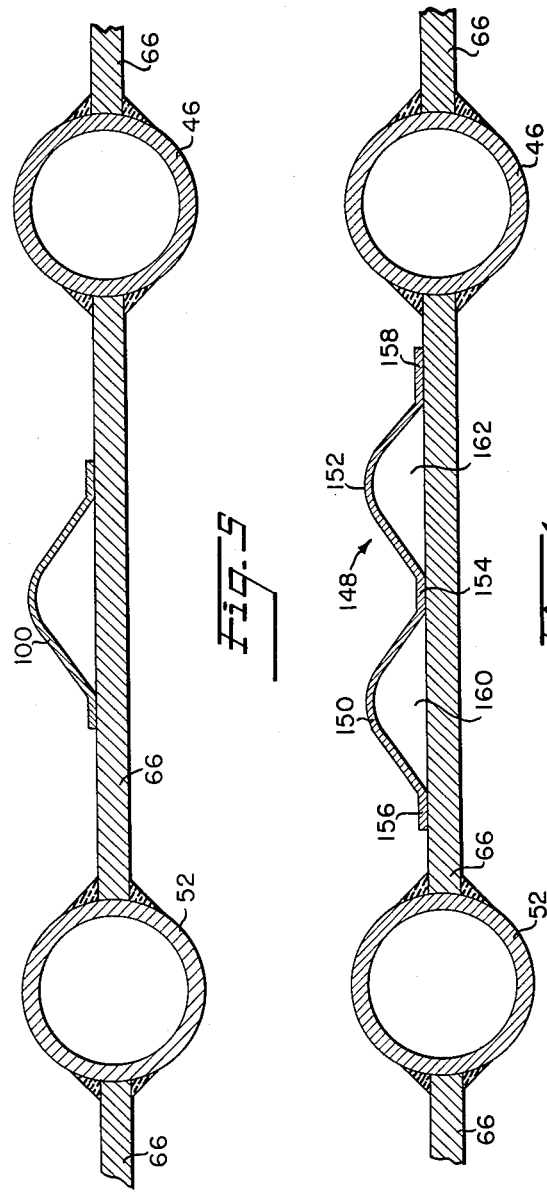
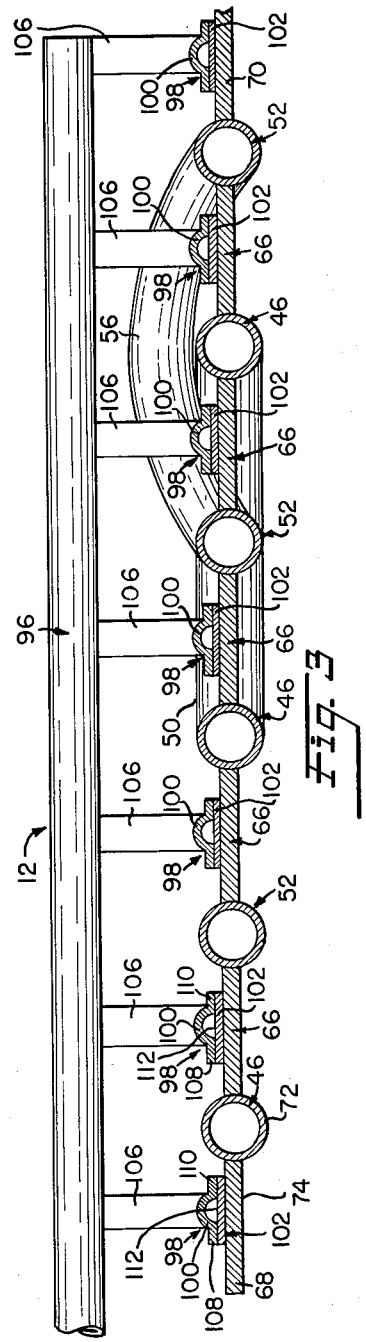
INVENTOR
HORACE L. SMITH, JR.
Strauch, Nolan & Neale
ATTORNEYS

United States Patent Office 3,258,204
Patented June 28, 1966

3,258,204
HIGH TEMPERATURE HEATING APPARATUS AND SYSTEM
Horace L. Smith, Jr., Richmond, Va., assignor to Hupp Corporation, Cleveland, Ohio, a corporation of Virginia
Filed Nov. 14, 1963, Ser. No. 323,840
16 Claims. (Cl. 237—56)

My present invention relates to heating apparatus and processes. More specifically, it relates to novel heating systems and processes employing circulating eutectic mixtures of inorganic salts as heat transfer mediums and to novel radiators for such systems.

One primary object of the present invention resides in the provision of novel improved systems, processes, and radiators of the type described above.

Another primary object of the present invention is the provision of novel improved radiant heating systems and apparatus for industrial processes, which are more efficient and capable of providing higher radiator temperatures than those of the prior art, and novel radiant heating processes with the foregoing advantages.

In innumerable industrial processes radiators are utilized for heating, drying, setting inks and resins and many other purposes for which convective or conductive heating alone is less efficient, more expensive, or relatively unsuitable or undesirable for other reasons. The speed of most of these processes is a more or less direct reflection of the radiator temperature since, at higher radiator temperatures, more heat is emitted from a given radiator surface and less time is therefore generally required to heat the object being treated. In addition, in many chemical, annealing, and other processes, minimum temperatures of several hundred degrees are necessary to obtain the desired reaction.

The radiant heating systems most commonly used for high temperature applications are: the closed system, extraneously heated, circulating liquid type; the unvented, gas-fired, perforated plate type; vented, gas-fired, and combustion product heated perforated radiant tube heaters; and electric radiant heaters. The latter are too expensive to operate for many applications and are used primarily in specialized applications where the extremely short wave length radiation they emit can be used to particular advantage. An example of a specialized application where such heaters can be profitably employed is in drying the ink on printed materials as disclosed in my copending application No. 262,569, filed March 4, 1963, for Drying Apparatus and Methods, which is now U.S. Patent No. 3,237,314 issued March 1, 1966.

Unvented gas-fired and vented radiant tube burners are capable of operating at high temperatures, but have drawbacks which make them unsuitable for many industrial processes. In unvented gas-fired radiant burners, a combustible mixture is burned on the open outer surface of a radiant face, heating the latter to incandescence and producing combustion products which may contaminate some processes. Also, certain unvented gas burners may be unsatisfactory in closely confined areas.

The vented, gas-fired, radiant tube heaters also evolve combustion products which, in some applications, must be evacuated. The problems created by this requirement makes this type of heater unsatisfactory for some applications of radiant heating.

For the foregoing exemplary and other reasons, the most satisfactory radiant heating system for various commercial applications is the direct furnace type in which a fluid medium heated in a separate heat transfer or furnace unit is circulated through a radiant heating unit or radiator. My present invention is concerned with improved systems, apparatus, and processing of this type.

In the past, hot water and steam have most commonly been employed as the circulating heat transfer media in such systems because of the low cost and availability of water. However, hot water and steam are, as a practical matter, incapable of producing radiator temperatures above 350° F. At this temperature steam has a pressure of about 135 p.s.i.a. which is close to the maximum pressure permitted by insurance underwriters and safety codes for systems of this type. Moreover, the cost of system components capable of withstanding higher pressures is too high to be economically feasible for many applications.

More recently, closed systems employing high boiling point hydrocarbons as the circulating heat transfer medium have been developed. One successful system of this type, which is capable of providing radiator temperatures up to about 750° F., is disclosed in my copending application No. 237,817, filed November 15, 1962, for High Temperature Heating Apparatus, which is now U.S. Patent No. 3,236,292 issued February 22, 1966. Novel improved radiators for use with this ssytem are disclosed in my copending application No. 323,848 filed November 14, 1963 for Heat Exchangers.

The decomposition characteristics of these hydrocarbons imposes the approximate 750° F. upper practical operating limit on the type of system described in the preceding paragraph. To date the commercially available hydrocarbon liquid capable of providing the highest radiator temperatures known to me is Therminol 77, a chlorinated biphenyl produced by the Monsanto Chemical Company. This material is liquid at ambient tempeartures and is circulated in liquid form at substantially atmospheric pressure. If it is heated to temperatures above 750° F. (i.e., temperatures approaching its boiling point), it decomposes rapidly, depositing in the system components a thick sludge which can impair circulation in a short time and can be removed only with difficulty and at great expense.

The undesirably low maximum temperatures attainable by liquid hydrocarbons led to the development of HTS as a heat transfer medium. HTS, which means "heat transfer salt," is a eutectic mixture of inorganic salts having a melting point of about 288° F. and is suitable for use at temperatures up to about 1100° F. One critical disadvantage of HTS as radiator heat transfer media is that they are solid at room or ambient temperatures and must be melted when the system is started up. Primarily as a result of the practical difficulties involved in melting the HTS, the only notable use of this material as a heat transfer medium heretofore has been in non-circulating systems; in specialized circulating systems to heat Houdry process vessels, Thermofor kilns, etc.; and in cooling systems for alkylamine converters and similar process apparatus. So far as I am aware, no commercial use of HTS has been made in radiant heating systems of the type to which the present invention relates.

The "melting" problem which has heretofore negated the use of HTS in circulating liquid radiant heating systems is the difficulty of melting the solidified HTS in the radiant heating units. Direct fired furnaces are normally employed as heating units in HTS systems so the solidified HTS in the heating unit can be readily melted. Jacketed valves and lines are available so that the HTS in these components can be readily melted by introducing high temperature steam into them. The relatively large storage tanks employed in such systems pose no difficulties since steam coils can be located in them.

However, the most efficient radiator units, as exemplified by those disclosed in copending application No. 323,848, employ small diameter tubes through which the the heat medium is circulated to heat my improved, large radiating surface area radiators. These tubes typically have inside diameters on the order of two inches and are therefore too small to accommodate steam coils. External jackets are impractical for a number of reasons—for example, an external jacket would blanket the entire radiant surface on one side of the radiator.

To overcome these difficulties, it has been proposed that a suitable solvent be added to HTS when the system is shut down and the solution pressurized to maintain the HTS in a liquid state. In this method of maintaining a liquid phase in the circulating system, which is described in United States Patent No. 2,910,244 to Payne, the solvent is evaporated when the system is subsequently started up so that only the HTS is circulated. Although theoretically operable, the Payne system is impractical for commercial applications due primarily to its complexity and to the necessity of maintaining the system under pressure when it is shut down.

In the present invention the above-discussed and other undesirable characteristics of prior art radiators (when utilized in HTS systems) and methods of liquifying HTS are eliminated by a novel radiator construction which utilizes an auxiliary fluid circulation system including flow channel forming members fixed to conductive webs disposed between the radiator tube runs. Hot water, steam, or other fluid is circulated through the auxiliary system; and the heat of the fluid is conducted through the webs and the radiator tube walls to the HTS. This method of melting the HTS is highly efficient; radiators embodying the principles of the present invention are simple and inexpensive to fabricate; and expensive additional components, as required in the Payne method of melting HTS, are unnecessary.

Another feature of the present invention is that, if it is desired to rapidly discontinue the supply of heat to the material being treated, a coolant such as water can be pumped through the auxiliary circulation system to extract heat from and cool the HTS. This is particularly important because of the high temperatures to which the HTS is normally heated, its high latent heat of fusion, and its high heat carrying capacity. Because of these factors, the material being treated or the radiator itself or both could be overheated and damaged if this novel provision for rapidly cooling the HTS were not made.

One exemplary application of the present invention is in drying paper to heat the wet web before it reaches the press section of the dryer. By using radiators in accord with the present invention over and under the web, heating rates of 18,000 B.t.u./hour/square foot of radiant surface can be obtained.

From the foregoing, it will be apparent that another object of the present invention resides in the provision of novel, improved radiators for radiant heating systems employing molten HTS as a circulating heat transfer medium.

A further object of this invention resides in the provision of radiators fabricated in accordance with the preceding object and equipped with novel auxiliary fluid circulation systems for melting and cooling the HTS in the radiators and in the provision of novel methods for melting and cooling the HTS.

A further object of the present invention is the provision of novel methods for melting and for cooling the HTS in radiant heating systems employing this material as a circulating heat transfer medium.

Other objects and further novel features of the present invention will become more fully apparent from the appended claims and as the ensuing detailed description and discussion proceeds in conjunction with the accompanying drawing, in which:

FIGURE 2 is a plan view of a novel radiator unit constructed in accordance with the principles of the present invention and employed in the radiant heating system of FIGURE 1;

FIGURE 3 is a section through the radiator unit of FIGURE 2, taken substantially along line 3—3 of the latter figure;

FIGURE 4 is a fragmentary section, similar to FIGURE 3, through an alternate form of radiator construction; and FIGURE 5 is a fragmentary section, similar to FIGURE 4, through a third form of radiator unit construction.

Figure 1:
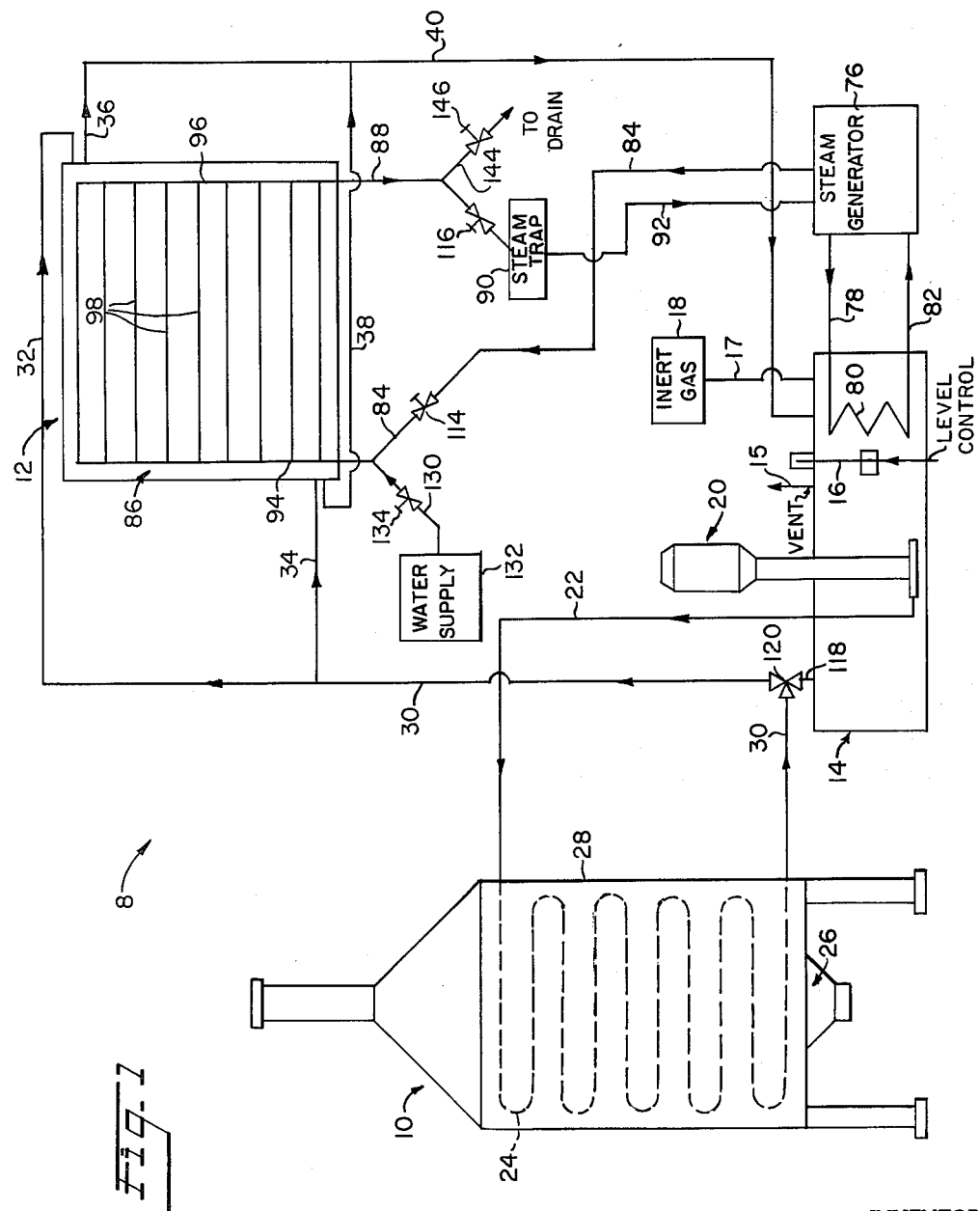
FIGURE 1 is a diagrammatic illustration of a circulting HTS radiant heating system constructed in accordance with the principles of the present invention.

Referring now to the drawing, FIGURE 1 illustrates an exemplary closed, circulating liquid type, radiant heating system 8 constructed in accordance with the principles of the present invention. In general, this novel system includes a heating unit 10, one or more radiators 12 (only a single radiator is shown for the sake of convenience), a closed system of flow conduits and ancillary equipment for circulating a heat transfer medium through the system, and a novel auxiliary heating and cooling system employed in starting up and shutting down the system.

One of the novel features of the present invention resides in employing HTS as a circulating medium, permitting the medium to be circulated at extremely high temperatures (up to 1100° F.) in liquid form. Consequently, the radiator units may be heated to heretofore unobtainable temperatures, and yet the system components need to be designed to withstand only very low pressure. HTS is a eutectic mixture of inorganic salts having a melting point of approximately 288° F. HTS has negligible vapor pressure so that the system may be operated at low or even at atmospheric pressures. Unlike the high boiling point hydrocarbons discussed above and other organic heat transfer mediums, HTS is stable, does not foul, and has superior thermal properties. In contrast to the heat transfer metals, it is safe, non-toxic, and has both low corrosion rates and low inventory costs. Moreover, HTS has an excellent thermal carrying capacity and is relatively inexpensive. Other physical characteristics of HTS are discussed in detail in an article by H. P. Voznick et al. entitled Molten Salt for Heat Transfer in the May 27, 1963, issue of Chemical Engineering to which reference may be had if desired.

Most commonly, HTS is formulated of 40% sodium nitrite, 7% sodium nitrate, and 53% potassium nitrate. HTS of this composition is marketed by Du Pont as "Hitec," by American Cyanamid as "Aeroheat 300," and by American Hydrotherm as "Hydrotherm 1200."

If desired, variations of the above composition may be employed such as, for example, the commercially available HTS mixture of 55% potassium nitrate and 45% sodium nitrite.

The HTS in introduced into the closed circulating system from a storage tank 14, provided with a vent 15 and a level control 16. Storage tank 14 is connected by a conduit 17 to a tank or other source 18 of an inert gas such as nitrogen. The inert gas provides an inert atmosphere throughout system 8 to prevent undesirable reactions of HTS and air in the system which would otherwise occur at temperatures above 850° F.

The HTS is pumped from storage tank 14 by a sump pump 20. One suitable type of pump is the propeller pump manufactured by Ingersoll-Rand Company especially for pumping molten salt. The outlet of pump 20 is connected by conduit 22 to heating unit 10.

Heating unit 10 may be of any desired commercial design, but is preferably of the vertical, cylindrical, shell-and-tube type with a sinuous or helical fluid heating coil. As illustrated, heating unit 10 includes sinuous heating tubes 24 (only one of which is shown) through which the circulating medium flows and over which hot gases generated by combustion units 26 pass. Tubes 24 and one or more combustion units 26 are housed in an outer shell 28 of conventional construction which is preferably lined with an appropriate refractory (not shown) to radiate heat to heating tubes 24. The combustion units may be either gas or oil burners or, if heating unit 10 is of larger capacity, may be coal fired.

The inlets of tubes 24 are connected to conduit 22; and the outlets are connected to main supply conduit 30 into which the heated molten HTS flows after leaving the heating unit. From main supply conduit 30, the molten HTS flows through branch supply conduits 32 and 34 into radiator 12, heating the latter to temperatures up to 1100° F. and causing it to emit substantial quantities of radiant energy (9,000 B.t.u. F., in excess of 10,000 B.t.u./square foot of radiant surface/hour if the HTS is at 1050° F., in excess of 10,000 B.t.u./square foot of radiant surface/hour if the HTS is heated to 1100° F.). From radiator 12, the HTS flows through branch return conduits 36 and 38 into main return conduit 40 which is connected to storage tank 14.

One of the important features of the present invention is the novel radiator unit 12 and the employment of this radiator in systems of the type described above.

Referring now to FIGURES 2 and 3, radiator 12 includes a substantially planar tube array formed by two sinuous, internested tube assemblies 42 and 44 providing labyrinthine flow paths for the heat transfer medium circulated through the heating system by pump 20. In the illustrated embodiment of radiator 12, tube assembly 42 is formed from a single tube bent to form parallel, spaced, side-by-side straight runs 46 connected, alternately, by end bends 48 at the left-hand end of the radiator and end bends 50 at the radiator's right-hand end.

Tube assembly 44, like tube assembly 42, is formed from a single tube and consists of straight runs 52 connected by end bends 54 at the left-hand end of the radiator and end bends 56 at the radiator's right-hand end. As is best shown in FIGURE 3, the end bends 54 and 56 of tube assembly 44 are bent outwardly to one side of the radiator, permitting tube assemblies 42 and 44 to be internested as shown in FIGURES 3 and 4 with the centerlines of the straight runs 46 in tube assembly 42 and the centerlines of the straight runs 52 in tube assembly 44 lying in the same plane.

Tube assembly 42 has an inlet 58 and an outlet 60; and tube assembly 44 has an inlet 62 and an outlet 64. As shown in FIGURE 2, inlet 58 of tube assembly 42 is located adjacent outlet 64 of tube assembly 44. The inlets 58 and 62 of tube assemblies 42 and 44 (see FIGURE 1) are connected to the branch supply conduits 32 and 34. The outlets 60 and 64 of tube assemblies 42 and 44 are connected to branch return conduits 36 and 38. As is shown by the arrows in FIGURE 2, the heat transfer medium therefore flows in opposite directions through the two tube assemblies 42 and 44, providing the most efficient exchange of heat between the HTS and the tube assemblies possible.

As shown in FIGURES 2 and 3, rectangular webs of conductive material 66, extending substantially the length of radiator 12, are connected between each straight run 52 of tube assembly 42 and the adjacent straight run 46 of tube assembly 44, as by welding. Similar webs 68 and 70 are fixed to the top of the uppermost tube run 46 and to the bottom of the lowermost tube run 52, respectively. Conductive webs 66, 68, and 70 increase the radiant surface of radiator 12; and, in addition, help bring about a substantially uniform emission of radiant energy across the entire surface of radiator 12 since the net effect of the internested tube assemblies, conductive webs, and the counterflow circulation of heat transfer fluid described above is to maintain the entire radiant surface of radiator 12 at a substantially uniform temperature.

The efficiency of radiator 12 is preferably increased by enhancing the emissivity of the radiator's radiant surfaces indicated generally by reference characters 72 and 74 in FIGURE 3. This is accomplished by coating radiant surfaces 72 and 74 with a highly emissive material. The coating may be applied in any suitable manner, as by chemical means such as anodizing, or by brushing, spraying, or rolling followed by subsequent baking or heat treatment, or by electrical deposition. Examples of suitable coatings are the colored silicone varnishes, lamp black applied in an appropriate vehicle, black enamel, lacquer, and shellac. Other suitable coatings having emissivity coefficients of 0.98 and higher and the manner in which they are applied are discussed in detail in my copending application No. 323,848, filed November 14, 1963 for Heat Exchangers, to which reference may be had if desired.

The side of the radiator 12 opposite radiant surfaces 72 and 74 may be covered with an appropriate insulating material (not shown) to prevent heat losses. If radiator 12 is employed in an application in which it is disposed between two areas or articles to be heated, the insulation may be deleted and a high emissivity coating applied to both sides of the radiator.

Many variations in the basic radiator structure described above may be made without exceeding the scope of the present invention. For example, the alternate methods of fabricating tube assemblies disclosed in copending application 323,848 may be utilized in the practice of the present invention as may the tapered and T-configured webs and end reflectors disclosed in that application. Or, as disclosed in the same application, a plenum chamber and suitable fan or blower may be employed to convert radiator 12 to an air heater. These and other variations of the basic radiator structure are, therefore, to be understood as being within the scope of the present invention.

As HTS is solid at ambient temperatures, it must be melted by heating it above its melting point of approximately 288° F. when the system is started up or a cold radiator put on the line. Another novel and important feature of the present invention is the novel apparatus provided to melt the HTS when system 8 is started up or when one or more radiators are put on the line. In contrast to the prior art systems (as shown in the above-mentioned Payne patent) in which the HTS is drained back into the storage tank when the system is shut down, the molten HTS is permitted to solidify in the system in the present invention. When the system is started up, the solidified HTS in heating tubes 24 is melted by the heat generated by combustion units 26. To melt the solidified HTS in storage tank 14 and in the various conduits, a steam generator 76 is employed. Steam generator 76 is connected by a supply line 78 to a coil 80 in storage tank 14 which, in turn, is connected by a return line 82 to steam generator 76. Steam, preferably at a pressure of at least 50 p.s.i.g., is circulated from steam generator 76 through heating coil 80 to melt the HTS in storage tank 14. Alternatively, hot water, preferably at a temperature of at least 295° F., may be employed as the circulating medium to heat the HTS.

The various valves and conduits in the illustrated heating system are preferably of the jacketed type; and, when the system is started up, steam is also directed through suitable conduits (not shown) and circulated through the conduit and valve jackets to melt the HTS solidified in these components.

Referring again to FIGURE 1, steam generator 76 is also connected by a supply conduit 84 to a novel auxiliary fluid circulation system 86 incorporated in radiator 12. A return conduit 88 extends from auxiliary circulation system 86 to a steam trap 90, of any desired construction, which is connected by a return conduit 92 to the steam generator.

Referring now to FIGURES 2 and 3, auxiliary circulation system 86 includes an inlet header 94, an exhaust header 96, and a plurality of channel assemblies 98, each consisting of a channel forming member 100 and a closure member 102, connected in parallel between inlet header 94 and outlet header 96 by conduits 104 and 106, respectively. Conduits 104 and 106 may be integral extensions of channel assemblies 98 or may be short, independent conduits fixed to the ends of the channel assemblies.

As is best shown in FIGURE 3, channel forming members 100 are substantially arcuately sectioned components, formed from sheet metal, and are provided with laterally extending flanges 108 and 110. Closure members 102 are elongated, flat metal strips welded, or otherwise sealed, to the flanges 108 and 110 of each channel forming member 100, closing the open face of the channel member to form a flow path indicated by reference character 112. As is best shown in FIGURE 2, a channel assembly 98 is fixed to and extends substantially the length of each of the conductive webs 66, 68 and 70 secured to the straight runs 46 and 52 in tube assemblies 42 and 44.

When the above-described heating system (or a radiator 12) is started up, a valve 114, interposed in steam supply conduit 84, is opened, allowing steam to flow from generator 76 into the inlet header 94 of auxiliary system 86. From header 94, the steam flows in parallel through flow paths 112 into exhaust header 96. From exhaust header 96, the cooled steam and/or condensate flows through an open valve 116, interposed in return conduit 88, to steam trap 90 and from the steam trap to steam generator 76.

The heat carried by the flowing steam is transferred by conduction through closure members 102, conductive webs 66, 68, and 70 and the tube walls in tube runs 46 and 52 to the solidified HTS in radiator 12. The heat thus transferred to the solidified HTS rapidly warms the latter, melting it and freeing it for circulation in the system, at which time valves 114 and 116 may be closed.

A bypass circuit arrangement, including a bypass conduit 118 connected between main supply conduit 30 and storage tank 14, is also preferably provided for starting up radiant heating system 8. Flow through bypass conduit 118 is controlled by a valve 120 which can be adjusted to divert the heated circulating medium from the main supply conduit through bypass conduit 118 into storage tank 14. This bypass arrangement is employed to bring the circulating HTS to operating temperature as quickly as possible. In starting up the system, bypass valve 120 is adjusted so that a substantial portion or all of the liquid in the circulating system will flow directly from heating coils 24 and conduit 30 back into heating unit 10, quickly raising the circulating medium to operating temperature since it circulates through a very short path and therefore loses little, if any, heat while circulating. After the HTS has reached the desired operating temperature, valve 120 is adjusted so that all of the HTS flows through main supply conduit 30.

As discussed above, one of the problems encountered in the use of HTS as a heat transfer medium is that, even after the flow of the HTS through a radiator is terminated, the radiator will continue to emit high amounts of heat due to the high temperatures at which HTS is commonly employed, the high latent heat of fusion of this material (35 B.t.u./lb. at 288° F.), and its high heat carrying capacity. Another novel feature of the present invention resides in the provision of cooling apparatus for rapidly removing heat from the HTS when the radiator or system is shut down to prevent overheating of the radiator and/or the objects heated thereby. Turning now to FIGURE 2 in which the cooling apparatus is shown, the steam supply conduit 84 described above is connected to the inlet 122 of auxiliary circulation system inlet header 94 through a Y-type fitting 124, one leg 126 of which is coupled to the steam supply conduit. The second leg 128 of fitting 124 (see also FIGURE 1) is connected by a conduit 130 to a source of cooling fluid which, in the illustrated embodiment, is any convenient source of water and is identified generally by reference character 132. When the radiant heating system (or radiator 12) is shut down, a valve 134 in water supply conduit 130 is opened; and water is circulated by an appropriate pump (not shown) from water supply 132 into auxiliary circulation system inlet header 94, then through flow paths 112 into exhaust header 96.

Turning again to FIGURE 2, the outlet 136 of exhaust header 96 of the auxiliary circulation system 86 is connected to one leg 140 of a Y-shaped fitting 138. The second leg 142 of fitting 138 is connected to a conduit 144 which may be led to any convenient drain. While water is circulating through auxiliary circulation system 86, a valve 146, interposed in conduit 144, is opened to permit the coolant to drain from exhaust header 96.

The flowing coolant acts as a heat sink; and the heat carried by the molten HTS is transferred through the walls of the tube assemblies 42 and 44, webs 66, 68, and 70, and channel assembly closure members 102 to the coolant. The coolant rapidly extracts heat from the molten HTS, ensuring against overheating of the radiator and/or the products heated thereby. When the HTS in radiator 12 has been cooled to the desired temperature, valve 134 in coolant supply conduit 130 and valve 146 may be closed.

Many modifications may be made in auxiliary circulation system 86 without exceeding the scope of the present invention. For example, as shown in FIGURE 5, the flanges 108 and 110 of channel forming members 100 may be welded or otherwise fixed directly to conductive webs 66, 68, and 70. In this case, the conductive webs themselves close the open sides of the channel forming members to form the flow paths 112.

A further exemplary modification of the present invention is shown in FIGURE 4. The auxiliary circulation system of this embodiment is identical to that described above except that the channel forming members 148 of this embodiment are formed with two corrugations 150 and 152 providing a central partition 154 extending longitudinally of and midway between the edges of the channel forming member. In this case flanges 156 and 158, identical to flanges 108 and 110 described above, and central partition 154 are all welded to the conductive web (66, 68, or 70). As shown in FIGURE 4, this arrangement provides two side-by-side flow paths 160 and 162 rather than the single flow channel 112 in the embodiment described above.

It will also be readily apparent that, if desired, closure members similar to the closure member 102 described above may be interposed between the conductive webs and the channel forming members in this embodiment if desired.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. Apparatus for transferring heat by means of a circulating heat transfer medium which is solid at ambient temperatures and molten at elevated temperatures, comprising:
   (a) a heating unit;
   (b) a heat radiating unit including:
   (c) a plural run tube array adapted to have said heat transfer medium circulated therethrough to thereby heat said tube array to temperatures at which substantial quantities of radiant energy are emitted therefrom;
   (d) conductive webs between adjacent runs of said tube array;
   (e) a fluid circulating system comprising at least one fluid channel forming member fixed to and extending along a major portion of the length of at least part of said webs;

(f) supply and return conduits connecting said heating unit and the tube array of said heat radiating unit; and (g) means for circulating a fluid through said fluid circulating system to effect a phase change in the circulating heat transfer medium in the radiating unit.

2. The apparatus as defined in claim 1, wherein said fluid circulating means includes;

(a) means for circulating a heated fluid through said fluid circulating system to melt the heat transfer medium; and (b) means for circulating a relatively cool liquid through said fluid circulating system to cool said medium.

3. The apparatus as defined in claim 1, including:

(a) a storage tank for the heat transfer medium; and (b) means for providing an inert atmosphere in said apparatus.

4. The apparatus as defined in claim 3, including a sump pump in said storage tank, the outlet of said pump being in fluid communication with said heating unit.

5. The apparatus as defined in claim 3, including means for melting the heat transfer medium in the storage tank.

6. The apparatus as defined in claim 1, wherein:

(a) the radiating unit includes means providing at least two internested flow paths; and (b) said supply and return conduits are connected to said radiating unit to effect counterflow in said flow paths and thereby provide substantially uniform emission of radiant energy from said radiating unit.

7. A radiator for use in a heating system employing a circulating heat transfer medium which is solid at ambient temperatures and molten at elevated temperatures, comprising:

(a) a substantially planar tube array comprising at least two internested sinuous tubes, each having straight tube runs connected by end bends with the runs of said tubes alternated;

(b) conductive webs between adjacent runs and extending substantially the length of said runs; and (c) a fluid circulating system comprising at least one fluid channel forming member fixed to and extending along a major portion of the length of each of said webs, an inlet header in fluid communication with first ends of the fluid channels, and an outlet header in fluid communication with the opposite ends thereof.

8. The radiator as defined in claim 7, wherein said members have an open side and laterally extending flanges, said flanges being fixed to said webs, whereby said webs close said openings.

9. The radiator as defined in claim 8, together with an elongated closure member interposed between at least some of said members and the associated webs to seal the openings in said members.

10. The radiator as defined in claim 7, wherein said channel forming members are fabricated from thin sheet metal.

11. The radiator as defined in claim 7, wherein each of said members has a central partition extending the length thereof and abutting the associated web, whereby each of said members provides two isolated adjacent flow paths.

12. The radiator as defined in claim 7, including:

(a) two valved conduits communicating with one end of said header for operatively connecting said header to either one of two sources of circulating fluid; and (b) two valved conduits connected to one end of the outlet header for connecting said header to a steam trap and to a drain.

13. The radiator as defined in claim 7, wherein the surfaces of the conductive webs opposite those to which the channel forming members are fixed and the tube surfaces between said opposite web surfaces are coated with a heat resistant material having an emissivity coefficient of not less than about 0.98.

14. The apparatus as defined in claim 1, including:

(a) a storage tank for the heat transfer medium;

(b) a bypass conduit between said supply conduit and said storage tank; and (c) selectively operable means for diverting flow from said supply conduit into said bypass conduit, whereby said medium may be circulated solely between said heating unit and said storage tank to decrease the time required to heat said medium to operating temperature.

15. In a radiant heating installation:

(a) a radiator having plural, sinuous, internested, multiple run tube assemblies providing independent flow circuits;

(b) means for effecting simultaneous counterflow of a eutectic mixture of inorganic salts which is solid at ambient temperatures and molten at elevated temperatures through said independent circuits;

(c) means for circulating a fluid medium into physically isolated heat conductive relationship with said eutectic mixture to effect a phase change in said mixture including:

(d) heat conductive members extending between adjacent runs of said tube assemblies; and (e) a fluid circulating system comprising at least one fluid channel forming member fixed to and extending along a major portion of the length of each of said members.

16. A radiator for use in a heating system employing a circulating heat transfer medium which is solid at ambient temperatures and molten at elevated temperatures, comprising:

(a) a first fluid circulating system comprising a plural run tube array adapted to have said heat transfer medium circulated therethrough to thereby heat said tube array to temperatures at which substantial quantities of radiant energy are emitted therefrom;

(b) conductive webs between adjacent runs of said tube array, said webs intersecting said runs substantially equidistant from the surfaces defined by the outer peripheries of the runs of said tube array; and (c) a second fluid circulating system comprising at least one fluid channel forming member fixed to and extending along a major portion of the length of at least part of said webs, an inlet header in fluid communication with a first end of said at least one member, and an outlet header in fluid communication with the opposite end thereof.

References Cited by the Examiner
UNITED STATES PATENTS

| | | | |
|---|---|---|---|
| 1,586,987 | 6/1926 | Govers | 126—378 |
| 2,188,975 | 2/1940 | Herz | 165—140 |
| 2,294,030 | 8/1942 | Higham et al. | 165—152 X |
| 2,593,963 | 4/1952 | Biggs | 122—33 X |
| 2,621,903 | 12/1952 | Cohler | 165—140 X |
| 2,874,941 | 2/1959 | Woolard et al. | 165—164 |
| 2,910,244 | 10/1959 | Payne | 237—56 |
| 3,039,453 | 6/1962 | Andrassy | 165—133 X |
| 3,055,642 | 9/1962 | Cox et al. | 165—164 |
| 3,117,621 | 1/1964 | Bockhorst | 165—171 |
| 3,153,446 | 10/1964 | Shaw | 165—164 |

EDWARD J. MICHAEL, *Primary Examiner.*

FREDERICK L. MATTESON, Jr., *Examiner.*

M. L. BATES, *Assistant Examiner.*